(12) United States Patent
Hua et al.

(10) Patent No.: US 12,430,950 B2
(45) Date of Patent: Sep. 30, 2025

(54) SYSTEMS AND METHODS FOR CONTINUAL LEARNING

(71) Applicant: Samsung Electronics Co., Ltd., Suwon-si (KR)

(72) Inventors: Ting Hua, San Jose, CA (US); Yilin Shen, Santa Clara, CA (US); Changsheng Zhao, San Jose, CA (US); Hongxia Jin, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1128 days.

(21) Appl. No.: 17/166,908

(22) Filed: Feb. 3, 2021

(65) Prior Publication Data

US 2021/0383272 A1    Dec. 9, 2021

Related U.S. Application Data

(60) Provisional application No. 63/034,821, filed on Jun. 4, 2020.

(51) Int. Cl.
*G06F 17/00* (2019.01)
*G06F 18/2431* (2023.01)
*G06N 20/00* (2019.01)
*G06V 20/20* (2022.01)
*G06V 40/12* (2022.01)
*G06V 40/20* (2022.01)

(52) U.S. Cl.
CPC .......... *G06V 40/28* (2022.01); *G06F 18/2431* (2023.01); *G06N 20/00* (2019.01); *G06V 20/20* (2022.01); *G06V 40/12* (2022.01)

(58) Field of Classification Search
CPC .... G06F 18/2431; G06N 20/00; G06N 3/045; G06N 3/084; G06N 3/096; G06N 3/0464; G06V 20/20; G06V 40/12; G06V 40/28; G06V 10/7715; G06V 10/776
USPC .......................................................... 706/12
See application file for complete search history.

(56) References Cited

U.S. PATENT DOCUMENTS

| | | | |
|---|---|---|---|
| 11,182,691 B1* | 11/2021 | Zhang | G06N 20/20 |
| 2019/0236482 A1 | 8/2019 | Desjardins et al. | |
| 2019/0354802 A1* | 11/2019 | Lin | G06F 18/22 |
| 2020/0005191 A1* | 1/2020 | Ganti | G06N 20/00 |
| 2020/0104688 A1* | 4/2020 | Benyahia | G06N 3/082 |
| 2020/0193552 A1* | 6/2020 | Turkelson | G06N 20/20 |
| 2020/0302524 A1* | 9/2020 | Kamkar | G06Q 10/067 |
| 2021/0073686 A1* | 3/2021 | Ding | G06N 20/20 |

(Continued)

*Primary Examiner* — Jason T Edwards
(74) *Attorney, Agent, or Firm* — Sughrue Mion, PLLC

(57) ABSTRACT

A continual learning method includes obtaining an input data including a trained model, continual learning (CL) Information, and training data by an electronic device. The method also includes re-training, using the electronic device, the model for a task based on the training data. The method also includes updating, using the electronic device, the CL Information based on the model and the training data. The method further includes selecting a first set of exemplars from the training data based on data associated with the CL Information. The CL Information includes a first group of variables associated with the model and a second group of variables associated with the model that changes to the first group of variables have stronger impact to the model's performance of the task than changes to the second group of variables.

22 Claims, 10 Drawing Sheets

(56) References Cited

U.S. PATENT DOCUMENTS

2021/0304056 A1* 9/2021 Qi .......................... G06F 17/00
2023/0326191 A1* 10/2023 Li .......................... G06N 3/096
                                                              382/155

* cited by examiner $$p(y|X) = \sigma(W^T \cdot \phi(X))$$

Figure 1: Fisher Information illustration.

Empirical Fisher information matrix corresponding to empirical Fisher information difference of all parameters in weight matrix calculated via data $\mathcal{X}_1$

SYSTEMS AND METHODS FOR CONTINUAL LEARNING

CROSS-REFERENCE TO RELATED APPLICATION AND PRIORITY CLAIM

This application claims priority under 35 U.S.C. § 119(e) to U.S. Provisional Patent Application No. 63/034,821 filed on Jun. 4, 2020, which is hereby incorporated by reference in its entirety.

TECHNICAL FIELD

This disclosure relates generally to machine learning methods and systems. More specifically, this disclosure relates to systems and methods for continual learning.

BACKGROUND

Deep Neural Networks (DNNs) have become the most successful machine-learning technique for solving a variety of tasks, including classification, natural language understanding (NLU), etc. Many artificial intelligence (AI) agents utilizing DNNs have been commercialized. AI agents include models, which are mathematical algorithms, that are "trained" using data and/or human supervision to replicate a decision a human would make when provided that same information.

To achieve artificial intelligence, AI agents are expected to learn and remember many different tasks. Moreover, they are expected to process a capacity for continual learning (CL), which is the ability to learn new tasks without forgetting how to perform previously trained tasks. CL means being able to update the model to take into account different tasks and data distributions, while still being able to re-use and retain useful knowledge and skills during time.

One type of AI agents, the intelligent personal digital assistant (IPDA) devices or services, such as AMAZON ALEXA, GOOGLE Assistant, and SAMSUNG BIXBY, allow third-party developers to build and integrate new features. Taking domain classification for example, besides pre-collected domains, IPDA devices also allow third-party developers to add new classes. In NLU, domain classification maps the spoken utterances to NLU domains, which often requires fast accommodation to new emerging domains. CL poses particular challenges for IPDA due to the tendency of losing knowledge of the previously learned task(s) as information relevant to the current task is incorporated. CL means that a model will be exposed to a sequence of tasks, which have difference in either their input distribution, label distribution, or both. When the model has no access to the training data of previous tasks when learning a new task, the shift of distributions among tasks introduces a significant interference to the learned parameters, thus largely undermines the performance of previous tasks. This phenomenon has been termed as catastrophic forgetting.

It is increasingly common for service providers to run AI models locally on user devices to avoid user data collection and communication costs, and to preserve user privacy. However, existing CL methods need some hyper-parameter tuning, which requires human involvement for every re-training to tune different hyper-parameters based on the new training data. End users of IPDA usually do not have the expert knowledge to perform such a task. Also, a naïve solution to overcome catastrophic forgetting is to re-train the model with full/entire dataset. However, it suffers from long model re-training time, huge computational costs and memory costs, which makes such a solution inapplicable for models operating locally on user devices. Most previous approaches capable of CL focus on the scenario that the model should be re-trained without any access to old data. However, it is hard to maintain the accuracy on both original/old and new tasks, i.e., the knowledge learned from previous tasks will be forgotten when the networks are re-trained to adapt new tasks. Existing methods suffer from poor accuracy as a result of catastrophic forgetting.

There has been an increased demand for a CL solution that can utilize only a little old data to yield high accuracy and maintain stable performance, without introducing extra parameters.

SUMMARY

This disclosure provides systems and methods for continual learning.

In a first embodiment, a continual learning method includes obtaining an input data including a trained model, continual learning (CL) Information, and training data by an electronic device. The method also includes re-training, using the electronic device, the model for a task based on the training data. The method also includes updating, using the electronic device, the CL Information based on the model and the training data. The method further includes selecting a first set of exemplars from the training data based on data associated with the CL Information. The CL Information includes a first group of variables associated with the model and a second group of variables associated with the model that changes to the first group of variables have stronger impact to the model's performance of the task than changes to the second group of variables.

In a second embodiment, an apparatus includes at least one processor configured to obtain an input data including a trained model, continual learning (CL) Information, and training data. The at least one processor is also configured to re-train the model for a task based on the training data. The at least one processor is also configured to update the CL Information based on the model and the training data. The at least one processor is further configured to select a first set of exemplars from the training data based on data associated with the CL Information. The CL Information includes a first group of variables associated with the model and a second group of variables associated with the model that changes to the first group of variables have stronger impact to the model's performance of the task than changes to the second group of variables. The apparatus also includes a memory coupled to the at least one processor that stores the model.

In a third embodiment, a non-transitory computer readable medium contains instructions that when executed by at least one processor cause the at least one processor to obtain an input data including a trained model, continual learning (CL) Information, and training data. The medium also contains instructions that when executed cause the at least one processor to re-train the model for a task based on the training data. The medium also contains instructions that when executed cause the at least one processor to update the CL Information based on the model and the training data. The medium further contains instructions that when executed cause the at least one processor to select a first set of exemplars from the training data based on data associated with the CL Information. The CL Information includes a first group of variables associated with the model and a second group of variables associated with the model that changes to the first group of variables have stronger impact to the model's performance of the task than changes to the second group of variables.

In a fourth embodiment, a continual learning method includes obtaining training data by an electronic device. The method also includes training, using the electronic device, a model using the training data to perform a task. The method also includes creating, using the electronic device, continual learning (CL) Information. The method further includes selecting a first set of exemplars from the training data based on data associated with the CL Information. The CL Information includes a first group of variables associated with the model and a second group of variables associated with the model that changes to the first group of variables have stronger impact to the model's performance of the task than changes to the second group of variables.

Other technical features may be readily apparent to one skilled in the art from the following figures, descriptions, and claims.

Before undertaking the DETAILED DESCRIPTION below, it may be advantageous to set forth definitions of certain words and phrases used throughout this disclosure. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first electronic device and a second electronic device may indicate different electronic devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
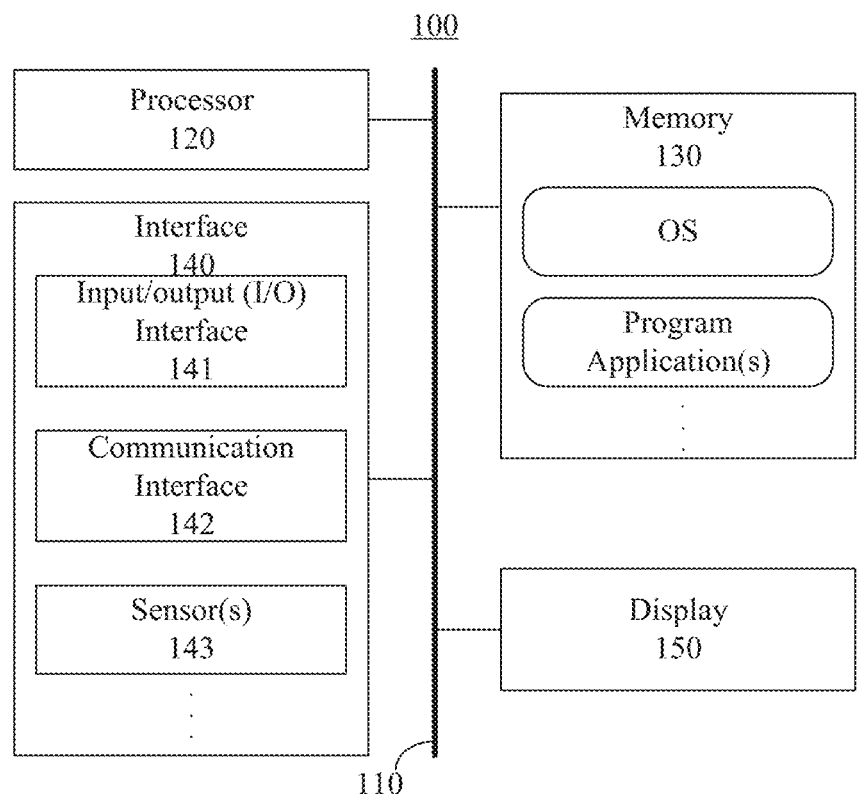
FIG. 1 illustrates an example electronic device in accordance with this disclosure.

A deep learning neural network learns to map a set of inputs to a set of outputs from training data (including input variables and target variables) via an optimization process that requires one or more loss functions to calculate the model error(s). Typically, training neural networks aims to minimize the error of the one or more loss functions.

A machine learning model (hereinafter referred to as "model") is a mathematical formula with a number of parameters that can be learned from data. Model training is a parameter learning process through which model parameters are fit by training the model with existing data.

An algorithm is used to navigate the space of possible sets of weights the model may use in order to make good or good enough predictions. The weights are updated using the backpropagation of error algorithm through training. The loss function estimates how closely the distribution of predictions made by the model matches the distribution of target variables in the training data. In the classic supervised learning scenario of machine learning, to train a model for some task and domain, labeled data for the same task and domain are provided. A task is the objective a model aims to perform, e.g. object classification, objection recognition, etc. Domain refers to a certain data distribution or from where the data is coming, e.g. images taken including dogs. A domain comprises a feature space $\chi$ and a marginal probability distribution P(X) over the feature space, wherein $X = x_s, \ldots, x_n \in \chi$. In ML, features or attributes of each data instance may be represented using a fixed-length (a.k.a. n) vector. Feature space refers to the n-dimensions space where the data instances is represented. Feature extractor changes data into hidden representations. In this disclosure, domain and class are used interchangeable.

Classification maps input variables to a class label, which is modeled as predicting the probability of an example belonging to each class. An example of classification problems is, given a handwritten character, classifying it as one of the known characters. Cross-entropy seeks a set of model weights that minimize the difference between the model's predicted probability distribution given a dataset and the distribution of probabilities in the training dataset.

Hyper-parameters are parameters that cannot be directly learned through the regular machine training process. Examples of hyper-parameters include network topology, number of hidden layers in a deep neural network, learning rate, number of iterations, batch size, momentum, weight decay, etc., which would have to be adjusted in order to obtain the best values for the model parameters. There are no simple and easy ways to set hyper-parameters. The process requires expertise and extensive trial and error, and also requires human involvement for every model re-training request, which are out of reach for the majority of end users of consumer electronic devices.

Some existing CL methods need to have access to the full set of old data (data used to train the original/old model). The model is then re-trained using both new data and the whole old data to produce a renewed model. The advantage of such solutions is that they tend to achieve good accuracy. The drawback is the long re-training time (for example, >3 hours on 1 V100 GPU) and tremendous cost in memory.

Some existing CL methods do not require old data. The original/old model is re-trained with only the new data, without any old data, to produce the renewed model. The advantage is straightforward—no additional storage is needed for the old data. The problem is poor accuracy due to catastrophic forgetting, and it requires human involvement for hyper-parameter tuning for every model re-training request based on the new training data. The latter is due to the fact that these methods often involve more parameters that require extensive efforts in expert tuning. However, it is impossible to ask inexperienced end users to set good parameters, especially when the practical datasets are usually noisy with imbalanced distribution. Moreover, in many practical cases, the real problem is not the absence of old data, but the inefficiency to re-train the whole model.

Examples from original training data have been proven to help maintain performance of re-trained model on old tasks, at some degree. Some existing CL methods store examples from original training data, and combine them with the new data for re-training. However, such approaches, when applied in domain classification, notwithstanding using neural network for feature extraction, discard the classifier based on neural network. For example, some domain classification methods use k-nearest neighbors algorithm as the final classifier rather than DNN because "uncontrollable changes" will happen to DNN parameters whenever the feature changes due to adoption of new data.

There is need for new DNN based CL methods that can control the changes to neural networks parameters, and achieve the following: (1) faster re-training and smaller storage cost by re-training a model using a combination of new data and a small amount of old data; (2) good accuracy (comparable accuracy with re-training using entire/full old training data); and (3) complete automation (no human efforts in parameter tuning). Such CL methods will produce models that can be conveniently reviewed with periodical system updates. To do so, the new CL methods need to resolve the following problems: (1) selecting examples from the old training data to maintain similar accuracy of re-training as using entire/full old training data, and (2) automatically tuning the model parameter without human involvement.

One or more embodiments provide systems and methods to achieve parameter-free (no human efforts in hyper-parameter tuning) efficient CL that utilize DNN as classifier while maintaining important information of old tasks. As described in more details below, a model is re-trained to generate a renewed model based on a combination of new data and a small amount of old data to achieve high accuracy, fast re-training time, small storage cost as well as full automation. More specifically, upon completion of training a model with old data, the process outputs a trained model, exemplars of old data and continual learning (CL) Information. The re-training process re-trains the trained model, using the exemplars and new data, to create a renewed model, where the feature extractor is kept unchanged but the weight matrix and the CL Information are expanded and updated, according to one embodiment. One embodiment selects exemplars using empirical Fisher information as the CL Information and learns new classes through regularity with dynamical weight consolidation.

Various embodiments demonstrate "controllable changes" via utilizing selected exemplar and specific learning method(s) so that information of both old data and model are recorded. While majority of existing CL approaches are applied to image data, one embodiment presents a continual domain classification model that can be efficiently applied to various applications based on text data.

Throughout this disclosure, model training refers to the process of training a neutral network based on old or original data to generate a trained model for old task(s). Model re-training refers to re-running the process that generated the trained model on at least partially new training data to produce a renewed or updated model for both old and new tasks. Sometimes, model training may be deemed as first training or initial training. Model re-training may take place multiple times after the initial training.

Figure 2:
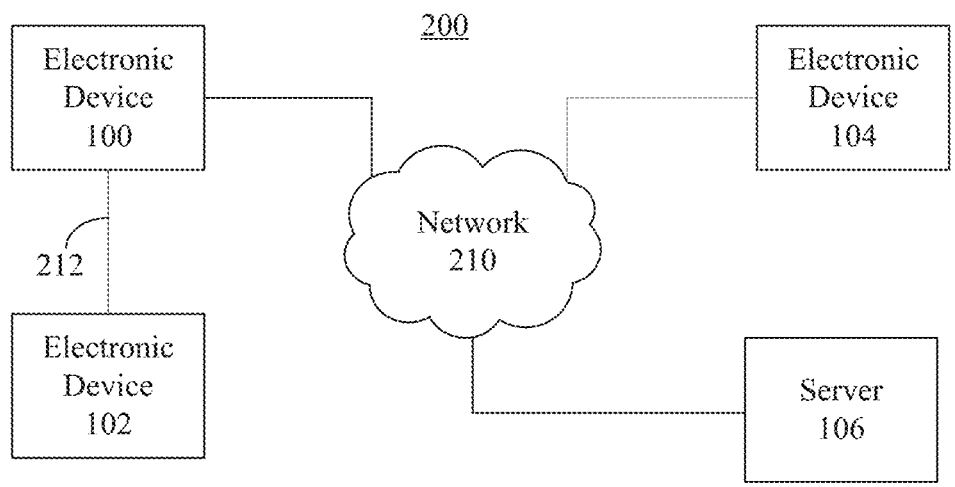
FIG. 2 illustrates an example network configuration including an electronic device in accordance with this disclosure.

The subsequently described approaches of training, re-training and/or operating the model may be performed by electronic device 100 of FIG. 1, in a network environment as shown in FIG. 2, according to one embodiment. FIGS. 1 and 2 are for illustration only, and other embodiments of the electronic device and network could be used without departing from the scope of this disclosure.

Electronic device 100 includes at least one of bus 110, processor 120, memory 130, interface 140, or display 150.

Bus 110 includes a circuit for connecting the components 120-150 with one another. It functions as communication system for transferring data between the components, or between electronic devices.

Processor 120 includes one or more of a central processing unit (CPU), a graphics processor unit (GPU), an accelerated processing unit (APU), many integrated core (MIC), a field-programmable gate array (FPGA), or a digital signal processing (DSP). Processor 120 is able to perform control of at least one of the other components of electronic device 100, and/or perform an operation or data processing relating to communication. Processor 120 executes one or more programs stored in memory 130. In some embodiments of this disclosure, for example, processor 120 may obtain and re-train a model into a renewed model to learn new tasks associated with new data, using a parameter-free CL method as described in more details below. In some embodiments, processor 120 may train a model for an old task and produce information to be used for further re-training of the model, using a parameter-free CL method as described in more details below.

Memory 130 may include a volatile and/or non-volatile memory. Memory 130 stores information, such as one or more commands, data, programs (one or more instructions), or applications, etc., that is related to at least one other component of electronic device 100 and for driving and controlling electronic device 100. For example, commands or data may formulate an operating system (OS). Information stored in memory 130 may be executed by processor 120.

The application may include one or more systems and/or methods for re-training at least one model to learn new tasks efficiently and stably, or the re-trained/renewed model, as discussed below. These functions can be performed by a single application or by multiple applications that each carry out one or more of these functions. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code.

Display 150 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. Display 150 can also be a depth-aware display, such as a multi-focal display. Display 150 is able to present, for example, various contents (such as text, images, videos, icons, or symbols).

Interface 140 includes input/output (I/O) interface 141, communication interface 142, and/or one or more sensors 143. I/O interface 141 serves as an interface that can, for example, transfer commands or data between a user or other external devices and other component(s) of electronic device 100.

Sensor(s) 143 can meter a physical quantity or detect an activation state of electronic device 100 and convert metered or detected information into an electrical signal. For example, sensor(s) 143 can include one or more cameras or other imaging sensors for capturing images of scenes. The sensor(s) 143 can also include a microphone, a keyboard, a mouse, one or more buttons for touch input, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 143 can further include an inertial measurement unit. In addition, sensor(s) 143 can include a control circuit for controlling at least one of the sensors included here. Any of these sensor(s) 143 can be located within or coupled to electronic device 100. Sensor(s) 143 may be used to detect touch input, gesture input, hovering input using an electronic pen or a body portion of a user, etc.

Communication interface 142, for example, is able to set up communication between electronic device 100 and an external electronic device (such as a first electronic device 102, a second electronic device 104, or a server 106 as illustrated in FIG. 2). As shown in FIG. 2, communication interface 142 can be connected with a network 210 or 212 through wireless or wired communication architecture to communicate with the external electronic device. Communication interface 142 can be a wired or wireless transceiver or any other component for transmitting and receiving signals.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC), a smart speaker or speaker with an integrated digital assistant (such as SAMSUNG GALAXY HOME), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). According to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

FIG. 2 illustrates an example network configuration 200. Electronic device 100 of FIG. 1 is connected with first external electronic device 102 or the second external electronic device 104 through network 210 and/or 212. Electronic device 100 can be wearable device, an electronic device-mountable wearable device (such as an HMD), etc. When electronic device 100 is mounted in the electronic device 102 (such as the HMD), electronic device 100 can communicate with electronic device 102 through communication interface 142. Electronic device 100 can be directly connected with electronic device 102 to communicate with electronic device 102 without involving a separate network. Electronic device 100 can also be an augmented reality wearable device, such as eyeglasses, that include one or more cameras.

The first and second external electronic devices 102 and 104 and server 106 each can be a device of the same or a different type from electronic device 100. They each may include all the components of electronic device 100. In some embodiments, they may exclude at least one of such components or may add at least one other component. According to certain embodiments of this disclosure, server 106 includes a group of one or more servers. Also, according to certain embodiments of this disclosure, all or some of the operations executed on electronic device 100 can be executed on another or multiple other electronic devices (such as electronic devices 102 and 104 or server 106). Further, according to certain embodiments of this disclosure, when electronic device 100 should perform some function or service automatically or at a request, electronic device 100, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to electronic device 100. Electronic device 100 can provide a requested function or service by processing the received result as it is or additionally. To that end, a cloud computing, distributed computing, or client-server computing technique may be used, for example. While FIGS. 10 and 11 show that electronic device 100 includes communication interface 142 to communicate with external electronic device 104 or server 106 via the network 210 or 212, electronic device 100 may be independently operated without a separate communication function according to some embodiments of this disclosure.

Server 106 can include the same or similar components 110-150 as electronic device 100 (or a suitable subset thereof). Server 106 can support to drive electronic device 100 by performing at least one of operations (or functions) implemented on electronic device 100. For example, server 106 can include a processing module or processor that may support processor 120 implemented in electronic device 100.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 210 or 212 includes at least one communication network, such as a computer network (like a local area network (LAN) or wide area network (WAN)), Internet, or a telephone network.

Although FIG. 2 illustrates one example of a network configuration 200 including an electronic device 100, two external electronic devices 102 and 104, and a server 106, various changes may be made to FIG. 2. For example, the network configuration 200 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

The embodiments of the disclosure described below may be written as computer-executable programs or instructions that may be stored in a computer readable medium.

The computer readable medium may continuously store the computer-executable programs or instructions, or temporarily store the computer-executable programs or instructions for execution or downloading. Also, the computer readable medium may be any one of various recording media or storage media in which a single piece or plurality of pieces of hardware are combined, and the computer readable medium is not limited to a medium directly connected to electronic device 100, but may be distributed on a network. Examples of the computer readable medium include magnetic media, such as a hard disk, a floppy disk, and a magnetic tape, optical recording media, such as compact disc (CD) and digital video disc (DVD), magneto-optical media such as a floptical disk, and read only memory (ROM), random access memory (RAM), and a flash memory, which are configured to store program instructions. Other examples of the computer readable medium include recording media and storage media managed by application stores distributing applications or by websites, servers, and the like supplying or distributing other various types of software.

A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

A model such as the DNN, Convolutional Neural Network (CNN), or Recurrent Neural Network (RNN) model, as described below, may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 106.

Figure 3:
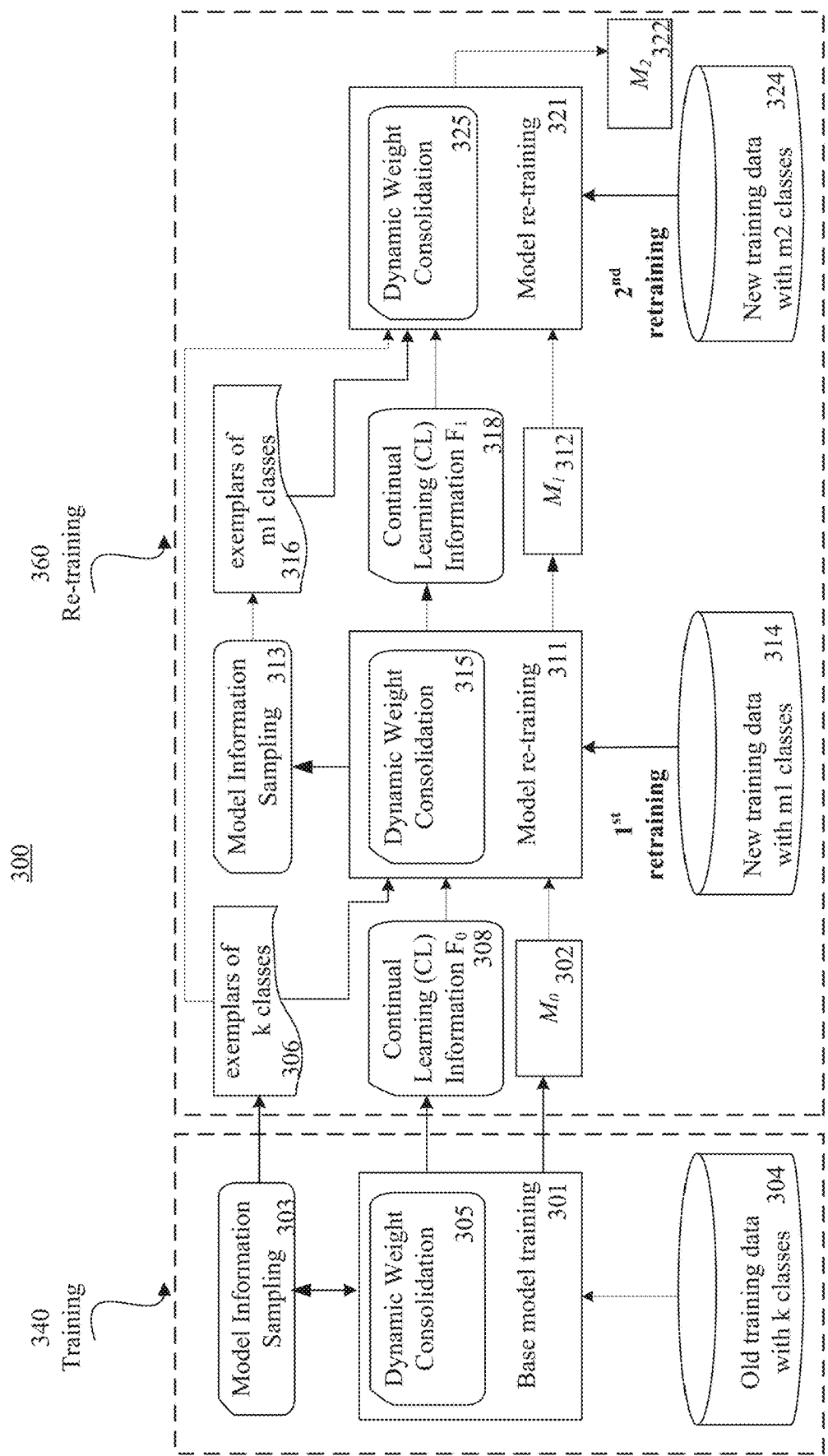
FIG. 3 illustrates an example technique for model training and re-training in accordance with this disclosure.

FIG. 3 illustrates an example technique for model training and re-training, according to some embodiments. For ease of explanation, operations and data involved in stages 340 and/or 360 may be described as being executed or otherwise used by the processor(s) of any of the electronic devices 100, 102, 104 or the server 106 in FIG. 1. However, technique 300 may be carried out by any suitable device(s) and in any suitable system(s).

Stage 340 describes original model training, and stage 360 illustrates model re-training. In stage 340, the processor, e.g., processor 120 of FIG. 1, performs base model training 301 to create a trained base model $M_0$ 302 for performing a certain task. In one embodiment, base model $M_0$ 302 has been trained to perform a classification task to predict k categorical labels (classes) using old training data 304, which includes data with k classes. In one embodiment, the k-class old training data 304 is annotated data that may include text, video or images. According to one embodiment, base model training 301 utilizes Dynamic Weight Consolidation (DWC) 305, which will be described in details below, to accomplish the parameter-free CL for subsequent re-training process(es). Upon completion of base model training 301, Continual Learning (CL) Information $F_0$ 308 is generated, which includes information to help recognize important model parameters that affects performance of base model $M_0$ 302 more than other model parameters. Model Information Sampling 303 is further performed to sample exemplars 306 from old training data 304 based on base model $M_0$ 302 and information associated with CL Information $F_0$ 308. Exemplars 306 helps remember important information of the certain task.

Stage 360 illustrates two re-training stages. At the first round of re-training, the processor, e.g., processor 120 of FIG. 1, obtains one or more outputs from stage 340, and stores them in the memory, such as memory 130 of FIG. 1. The one or more outputs may include at least one of the following: base model $M_0$ 302, exemplars 306, or CL Information $F_0$ 308.

According to one embodiment, the processor further receives new training data 314 with m1 classes, and stores the new data in memory.

In one embodiment, at the time to expand the classification function of base model $M_0$ 302, the processor performs model re-training 311. Model re-training 311 re-trains base model $M_0$ 302, using both exemplars 306 and new training data 314, through DWC 315, to produce renewed model $M_1$ 312 that is able to categorize both k and m1 classes, without compromising classification accuracy. Upon completion of model re-training 311, CL Information $F_0$ 308 is updated to generate CL Information Fi 318. Exemplars 316 is selected from new training data 314 via Model Information Sampling 313.

The above described model re-training process may be repeated to keep expanding functions of the model upon receipt of new classes of training data. For example, to further expand the classification function of renewed model $M_1$ 312 to support k, m1 and m2 classes, reviewed model $M_1$ 312 may be further re-trained to produce renewed model $M_2$ 322 based on new training data 324 with m2 classes, exemplars 306 and exemplars 316, through model re-training 321, at the second round of re-training.

While Stage 360 includes only two re-training stages, those of ordinary skill in the art should understand that additional re-trainings may be performed following the same technique to enable parameter-free CL.

Figure 4:
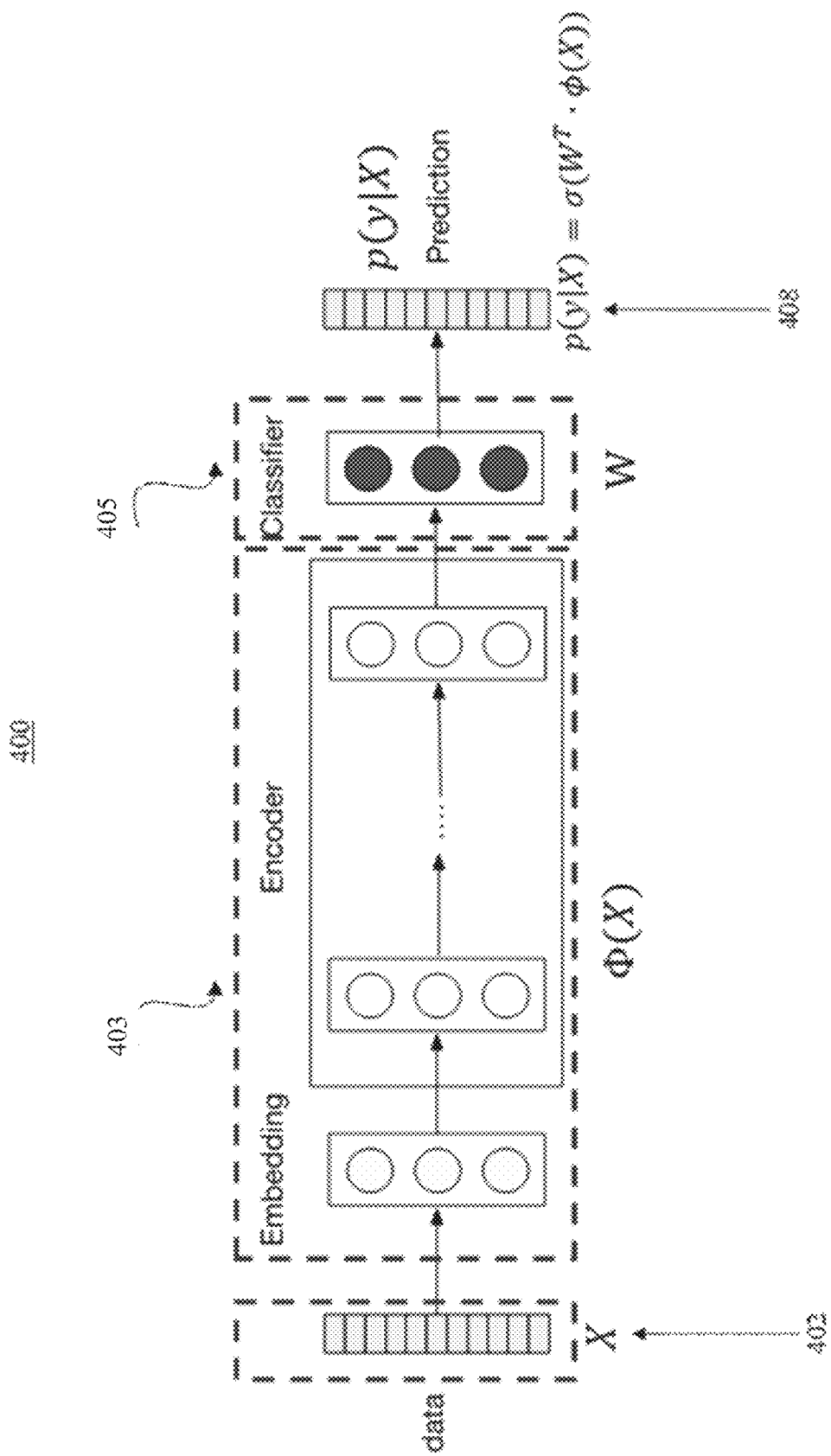
FIG. 4 illustrates an example model training architecture in accordance with this disclosure.
Figure 5A:
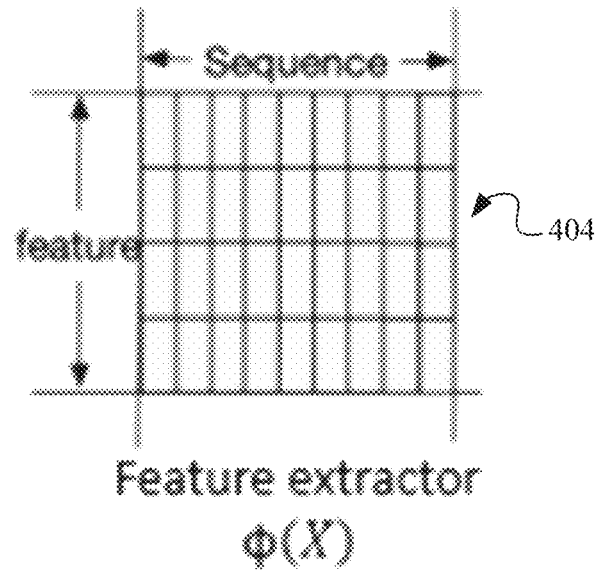
FIGS. 5A, 5B, and 5C illustrate matrices involved in model training in accordance with this disclosure.

FIG. 4 illustrates an example model training architecture 400 for a classification task, according to some embodiments. During the training process, feature extractor 403 maps input X 402, which is a sequence of data (with length of sequence s), into feature extractor matrix 404, which is a matrix of hidden representation of the sequence with dimension of ((number of features f) by s). Each element of a feature vector of this matrix represents value of a feature of a data point of input X 402. FIG. 5A illustrate an example feature extractor matrix 404.

Figure 5B:
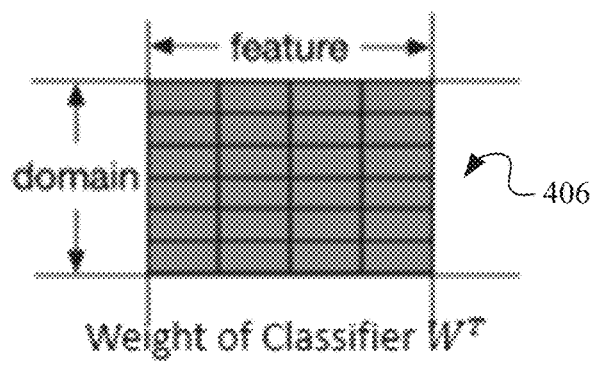

The matrix of hidden representation of the sequence is taken by classifier 405 to generate prediction 408. Weight of classifier 405 is represented by a weight matrix $W^T$ (T represents transpose) 406, which has a dimension of ((number of domains d) by f). An illustration of $W^T$ is shown in FIG. 5B. In this disclosure, phrase "weight matrix" is interchangeably used with terms "weight of classifier" and "$W^T$."

Figure 5C:
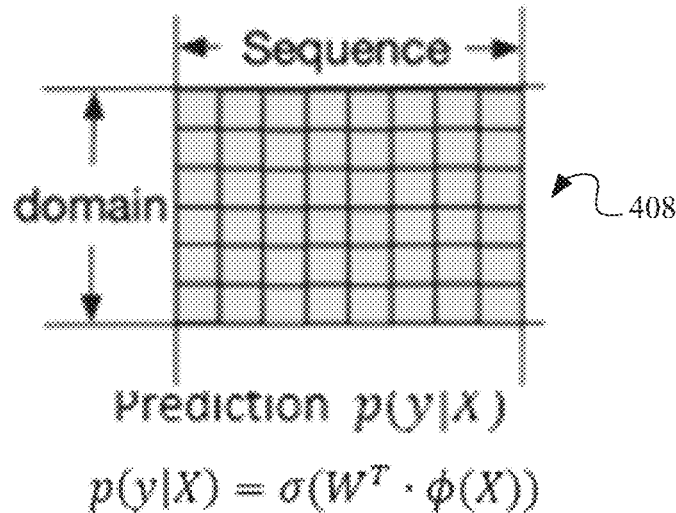

Prediction 408 provides the results by multiplying feature extractor matrix 404 and $W^T$. Prediction 408 is also a matrix, whose dimension is d by s as illustrated in FIG. 5C. Once the model is trained, operation of the model to perform classification may follow the same architecture. Also, model re-training may also follow the same architecture.

Figure 6A:
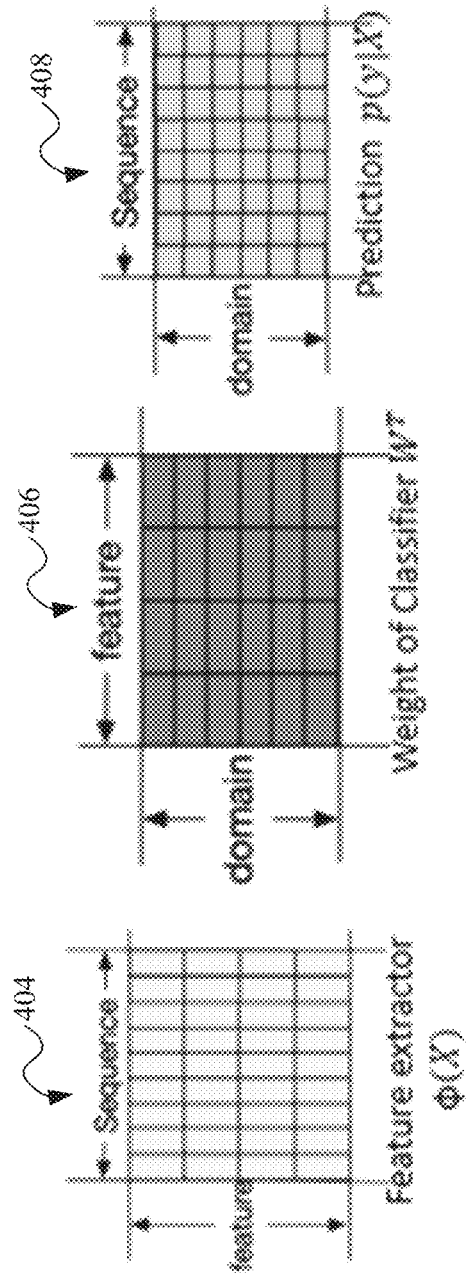
FIGS. 6A and 6B demonstrate challenge faced by model re-training in accordance with this disclosure.
Figure 6B:
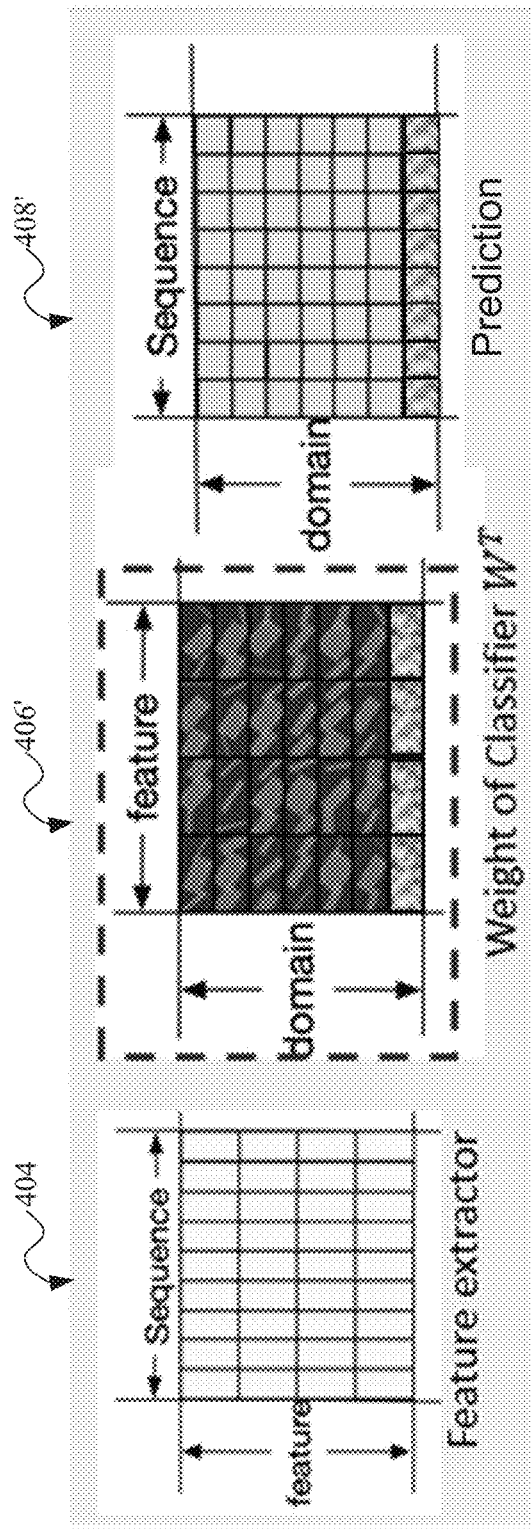

FIGS. 6A and 6B demonstrate challenges faced by model re-training in accordance with this disclosure. FIG. 6A shows matrices involved after initial model training. FIG. 6B shows the updated matrices as a result of model re-training. The purpose of re-training is to enable the model to predict new data classes, according to one embodiment. Therefore, weight matrix 406 adds new rows to formulate weight matrix 406' in response to the new classes of data, which also results in introducing additional rows in prediction 408 to generate prediction 408'.

The goals of model re-training, for example, are to: (1) make prediction of both new and old classes, and (2) achieve good performance on both old and new data, according to one embodiment. To satisfy the first goal, feature extractor matrix 404 should stay unchanged, while both size of weight matrix 406 and all parameters in it are changed. However, the latter will hurt the second goal because performance on old task can hardly be maintained as modifications to important parameters in the weight matrix will result in big changes in performance.

Therefore, to maintain good performance of old task, the challenge is to make the least modification possible to important parameters of weight matrix 406. This also means re-training should involve mostly less important parameters. However, there is no universal standard to distinguish important parameters from less important parameters.

Generally speaking, a trained model is an optimal one. Therefore, in one embodiment, the values of parameters of weight matrix 406 are expected to be around the optimum, when the model is trained for classification task. For example, if values of parameters of weight matrix 406 are θ and the performance impacts of parameters are represented by p(X|θ) (the likelihood curves), then the values of respective θ for the parameters w should be around the respective optimal value $\theta_0$ (a theoretical value whose $1^{st}$ order derivative is almost zero) for each w. Those skilled in the relevant art will understand that parameter(s) other than parameters of weight matrix may be around the optimum value, when the model is trained for tasks other than classification. When parameters whose value changes are consistent and align with the model performance change are around their optimal values, the model performance is likely maximized/optimized.

Figure 7:
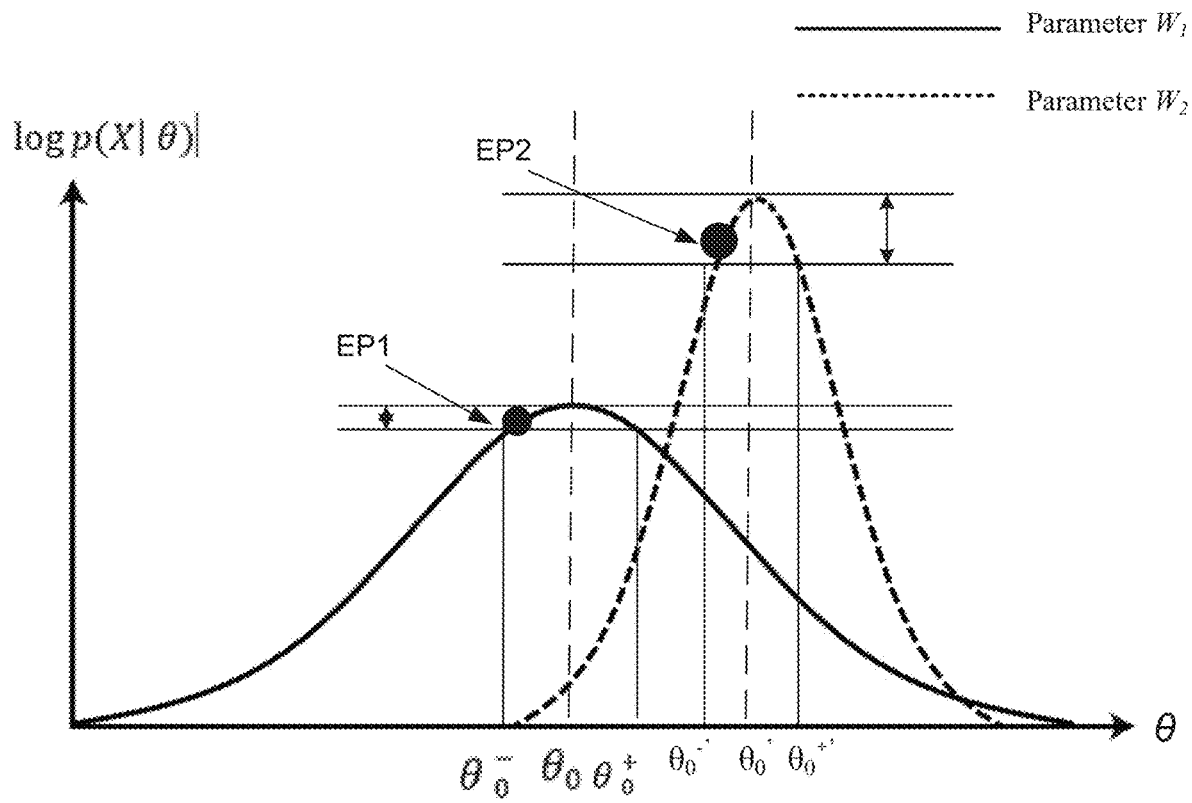
FIG. 7 illustrates example likelihood curves corresponding to parameters of weight matrix after training in accordance with this disclosure.

FIG. 7 illustrates example likelihood curves corresponding to parameters of weight matrix after training for a classification model. Suppose there are two parameters, Parameter $w_1$ and Parameter $w_2$, in the trained model. Both parameters are supposed to be around their respective optimal values $\theta_0$ and $\theta_0'$. For example, after training, Parameter $w_1$ has value EP1, and Parameter $w_2$ takes value EP2. As shown in FIG. 7, within the ranges of $[\theta_0^-, \theta_0^+]$ and $[\theta_0'^-, \theta_0'^+]$ the steepness of the two curves indicates that the change of likelihood of Parameter $w_2$ is much bigger than that of Parameter $w_1$. The ranges of $[\theta_0^-, \theta_0^+]$ and $[\theta_0'^-, \theta_0'^+]$ are determined based on the optimization of the weight matrix. Different parameters may have different ranges.

Therefore, it is relatively safe to choose any values from the range of $[\theta_0^-, \theta_0^+]$ for Parameter $w_1$, as it barely makes any difference to the performance. This also means that Parameter $w_2$ is more important, as changes of its value will result in noticeable variation to the performance. Accordingly, the problem of identifying the important parameters becomes how to identify the sharper curve(s) of performance impact associated with these parameters.

TABLE I

|  | Value EP1 | Value EP2 |
|---|---|---|
| $1^{st}$ order derivative | 0.00000000054 | 0.000000000009 |
| $2^{nd}$ order derivative $\Delta \hat{I}(\theta_{w_j})$ | 0.003 | 0.121 |

The $2^{nd}$ order derivative measures the rate of change of the rate of change of a point at a graph (it may be understood as the "slope of the slope"). As can be seen from Table I, both EP1's and EP2's $1^{st}$ order derivatives are close to zero, while the $2^{nd}$ order derivatives $\Delta\hat{I}(\theta_{w_1})$ and $\Delta\hat{I}(\theta_{w_2})$ are still non-zero. For example, the $2^{nd}$ order derivative of EP2 is larger than that of EP1. In one embodiment, the importance of parameters is thus determined through calculating the $2^{nd}$ order derivative of the values of the parameters. The bigger the value of the $2^{nd}$ order derivative, the more important the corresponding parameter.

Once important parameters are identified, a sampling method may be carried out to select the representative examples that can help "remember" such important parameters of the initially trained model from the old training data. Subsequently, in the next re-training process, the renewed model is learnt, based on the initially trained model, utilizing Dynamic Weight Consolidation to balance the performance of old and new tasks based on the representative examples and the new training data.

One embodiment uses Fisher information to calculate the $2^{nd}$ order derivative around the optimal. Fisher information is thus utilized in both Model Information Sampling and Dynamic Weight Consolidation. The former selects exemplars from the old training data to identify these that may produce higher empirical Fisher information for parameters, and the latter avoids changing important parameters by referring to their corresponding empirical Fisher information.

Fisher information measures how much information an observable random variable carries about parameter. Considering a DNN model being trained for classification tasks, based on training data $X=\{X_1, \ldots, X_k\}$ with k domains/classes, where each set $X_y=x_1, \ldots, x_n$ is the collection of examples in class $y \in Y$, for finding the best parameters $\Theta$ that can maximize the log probability $p(\Theta|X)$ of the correct label Y, for a parameter $\theta$ in the network $\Theta$, its Fisher information is defined as the variance of the gradient of the log-likelihood:

$$I(\theta) = \text{Var}(s(\theta)) = E\left[\left(\frac{\partial}{\partial \theta}\log p(X \mid \theta)\right)\left(\frac{\partial}{\partial \theta}\log p(X \mid \theta)\right)^T\right]. \quad (1)$$

Fisher information can be calculated directly, if the exact form of log $p(X|\theta)$ is known. However, the likelihood is often intractable. Instead, empirical Fisher information $\hat{I}(\theta)$ is computed through samples $x_i \in X$ drawn from $p(X|\theta)$:

$$\hat{I}(\theta) = \frac{1}{N}\sum_{i=1}^{N}\left(\frac{\partial}{\partial \theta}\log p(x_i \mid \theta)\right)\left(\frac{\partial}{\partial \theta}\log p(x_i \mid \theta)\right)^T. \quad (2)$$

N represents the total number of data x in the training data. When log $p(X|\theta)$ is twice differentiable with respect to θ, Fisher information can be written as the second derivative of likelihood:

$$I(\theta) = -E\left[\frac{\partial^2}{\partial\theta^2}\log p(X\mid\theta)\right]. \quad (3)$$

Figure 8:
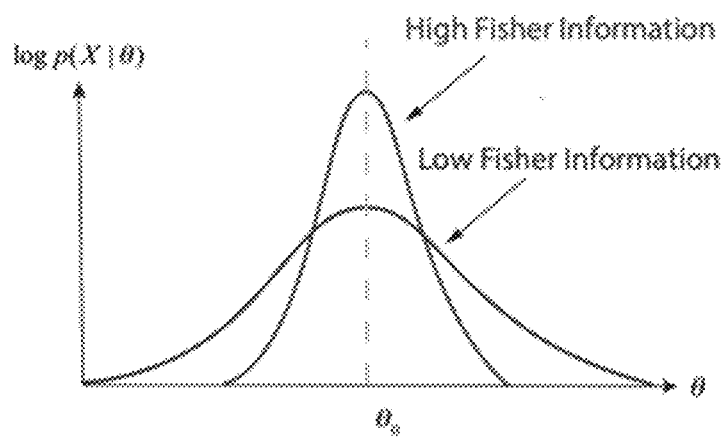
FIG. 8 illustrates Fisher Information in accordance with this disclosure.

Therefore, a high value Fisher information $I(\theta)$ presents a sharp peak of likelihood with respect to $\theta$ as illustrated in FIG. 8, and $\theta$ can be inferred from data X. And data X provides sufficient information about the correct value for parameter $\theta$.

In view of the empirical Fisher information calculation of Eq. 2 and the physical meaning of Fisher information revealed by the second derivative form of Eq. 3, how much information each sample $x_i$ brings to the estimation of parameter $\theta$ may be measured by the empirical Fisher information difference as:

$$\Delta\hat{I}_i(\theta) = \left(\frac{\partial}{\partial\theta}\log p(x_i\mid\theta)\right)\left(\frac{\partial}{\partial\theta}\log p(x_i\mid\theta)\right)^T. \quad (4)$$

In one embodiment, Model Information Sampling selects the set of exemplars using the empirical Fisher information difference. For DNN based classification models including a feature extractor and classifier, Fisher information of parameters of both the feature extractor and classifier may be calculated. In one embodiment utilizing Bidirectional Encoder Representations from Transformers (BERT) for text classification, however, the trained parameters $\Theta$ may be split into a fixed feature extraction part $\Phi$ such as feature extractor matrix 404, and weight matrix W, where W is weight parameters of classifier 405. With parameters of feature extractor $\Phi$ fixed, only Fisher information of parameters $\theta_w \in W$ are calculated. $\Phi$ takes data stream X as input sequences, and outputs the hidden representations H of the sequences. To predict the true label y, a softmax classifier may be represented as $p(\hat{y}\mid X) = \sigma(W^T \cdot H) = \sigma(W^T \cdot \Phi(X))$, in one embodiment. Thus, the practical computation of Fisher information difference for sample $x_i$ on parameter $\theta_w$ becomes:

$$\Delta\hat{I}_i(\theta_w) = \left(\frac{\partial}{\partial\theta_w}\log\left[\sigma\left(W^T \cdot \Phi(x_i)\right)\right]^{(y_i)}\right)^2, \quad (5)$$

where the likelihood is calculated as the log-probability value of the correct label $y_i$ of sample $x_i$. Such a calculation is more computationally efficient than directly calculating the $2^{nd}$ order derivative of $\theta_w$. Each input data x generates one empirical Fisher information matrix corresponding to all parameters of W. Those of ordinary skill in the art should understand that for models trained for other types of tasks, different type of parameters (other than the weight matrix of classifier) and/or more than one type of parameters may be involved to calculate the Fisher information. Further, Eq. 5 may be transformed to reflect how such type(s) of parameters correlates to or influences the performance of the model.

The total empirical Fisher information difference value a sample carrying is thus the sum over all $\theta_w \in W$, as:

$$\Delta\hat{I}_i = \sum_{w=1}^{h \times k} \Delta\hat{I}_i(\theta_w), \quad (6)$$

where k is the number of domains that have been observed, h is the size of the final hidden state H.

Table II shows an example of empirical Fisher information matrix associated with the parameters of weight matrix 406 based on a specific input data x. The 3rd column, which has high empirical Fisher information, indicates that the corresponding parameters of the weight matrix 406 are more important than the others.

TABLE II

| 0.015 | 0.002 | 0.321 | 0.012 |
| 0.013 | 0.001 | 0.154 | 0.004 |
| 0.003 | 0.001 | 0.107 | 0.002 |
| 0.012 | 0.000 | 0.234 | 0.007 |

Figure 9:
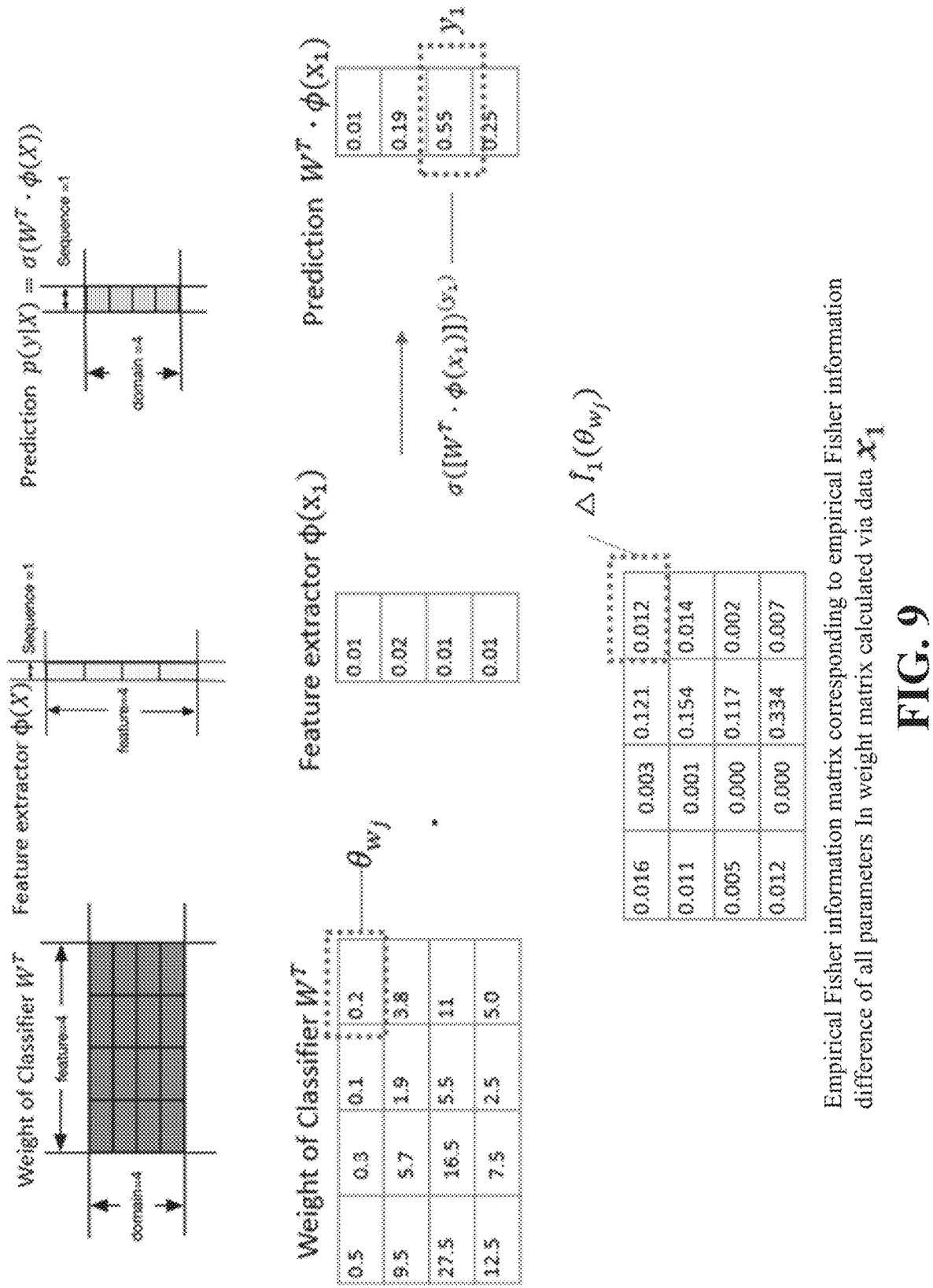
FIG. 9 shows an example of computation of empirical Fisher information difference of parameters in weight matrix calculated via input data in accordance with this disclosure.

Eq. 5 indicates that the computation of empirical Fisher information difference for data $x_1$ on parameter $\theta_w$ needs inputs of both feature extractor matrix 404 $\phi(x_1)$ and weight matrix 406 $W^T$. FIG. 9 provides an example to help understanding of the computation process of empirical Fisher information difference of parameters in weight matrix calculated via one input data.

Suppose the model is to be initially trained to classify input data into one of 4 domains. For training data $x_1$ of sequence 1, the ground truth domain prediction is the $3^{rd}$ domain (y1=3). Assuming there are 4 feature numbers, feature extractor 403 maps data $x_1$ to 4 features to produce matrix $\phi(x_1)$ of size 4×1.

As mentioned above, weight of classifier $W^T$ is a matrix that is the same for every input data x. The j-th element in this matrix is parameter $w_j$, and its value in the model is $\theta_{w_j}$. Accordingly, $W^T$ has 4×4 (domain×feature) such parameters, in this example.

Prediction matrix is the inner product of $W^T$ and $\phi(x_1)$. The element corresponding to the target prediction y1 is denoted as $\sigma([W^T \cdot \phi(x_1)])^{(y_1)}$. Since y1 is the $3^{rd}$ domain, its value becomes 0.55, which is the 3rd row of the prediction matrix.

According to Eq. 5, the empirical Fisher information difference corresponding to $\theta_{w_j}$ is denoted as $\Delta\hat{I}_1(\theta_{w_j})$, which is computed as the square of the 1st order derivative of log likelihood of $\sigma[W^T \cdot \phi(x_1)]^{(y_1)}$ over $\theta_{w_j}$.

In this example, $\sigma[W^T \cdot \phi(x_1)]^{(y_1)}$ is element 0.55 in prediction matrix, and $\theta_{w_j}$ is 0.2 in $W^T$. Therefore, the empirical Fisher information difference of $\theta_{w_j}$ is 0.012. The empirical Fisher information matrix calculated in response to data $x_1$, for all element $\theta_{w_j}$ of the matrix of classifier $W^T$, is shown as well. The sum of all its elements is 0.809, as provided by Eq. 6.

With the understanding of calculation of empirical Fisher information matrix, the following describes Model Information Sampling and Dynamic Weight Consolidation.

One embodiment provides Model Information Sampling, a method that selects examples that may produce higher total value of empirical Fisher information for parameters of weight matrix 406 from the old training data. Model Information Sampling selects samples based on the sum of each empirical Fisher information matrix. The selected samples will be used together with new training data to re-train the model.

Assuming there is a trained model that has been trained using data $X^o$ stream of k domain to output classification label prediction set $Y^o$. The trained model has prediction matrix $\Theta^o$.

$X^n$ represents new training data of additional domains k'. The model thus is to be re-trained to output additional classification label prediction set $Y^n$. The re-trained model has prediction matrix $\Theta^n$.

For each parameter $\theta_w$ of weight matrix $W^n$ (size h×k), it calculates the corresponding empirical Fisher information difference $\Delta\hat{I}(\theta_w)$, as explained in the above example. For each sampled data from old training data, it then sums over all empirical Fisher information difference corresponding to all the parameters in weight matrix $W^o$. A data sample results in larger empirical Fisher information sum is considered to be more important in helping "remember" important parameters of the trained model.

According to one embodiment, the sampling rate is r. The trained model is capable of classifying k classes. For each class, based on the ground truth class label of each sample data, all sampled data labeled for this class is ranked according to their respective sum of empirical Fisher information matrix. A number of top ranked sampled data from the total ranked sample data are selected for this class, satisfying the sample rate r. The so selected top ranked sampled data from all k classes form the exemplars E of data stream $X^o$.

An exemplary algorithm describing the exemplar selection process is provided in Alg. 1 below. Within each class k, the top samples ranked by their respective sum of the empirical Fisher information matrix are selected till the target sample rate r is met. Experiments show the model converges faster during re-training under various sample rates than random sampling. This means that model information sampling brings less "damage" to the original model and records more information from the original training data.

---

Algorithm 1: Construction of exemplar set

Input: original data stream $X^o$
Input: trained neural network $\Theta^o = \{\Phi, W^o\}$
Input: sample rate r
1  for each sample $x_i$ do
2    for each parameter $\theta_w \in W^o$ do
3      calculate $\Delta\hat{I}_i(\theta_w)$ using $$\Delta\hat{I}_i(\theta_w) = \left(\frac{\partial}{\partial\theta_w}\log[\sigma(W^T\cdot\Phi(x_i))]^{(y_i)}\right)^2$$

4  calculate $\Delta\hat{I}_i$ using $$\Delta\hat{I}_i = \sum_{w=1}^{h\times k}\Delta\hat{I}_i(\theta_w)$$

5  for each class k do
6    rank the samples $x_i \in X_k$ by Fisher information difference $\Delta\hat{I}_i$
7    select the top $|X_k| \times r$ examples and their labels as $E_k$
Output: exemplar set $E \leftarrow \{E_1, \cdots, E_k\}$

---

Sample rate r may be determined by the system carrying out the model training process. In one embodiment, a system may use binary search to try out different sample rates. For example, it may start with a relatively low sample rate, and double the sample rate until the accuracy requirement is satisfied. It may also be determined based on the characteristic of the training data. In one embodiment, sample rate r is determined to keep the size of the exemplars of the old training data and the size of the new training data comparable. When sample rate increases, a model may achieve better accuracy, but may also need more re-training time. In one embodiment, the sample rate is determined based on a trade-off between the re-training time and the performance accuracy. For example, based on experimental data, one model may achieve 98% of original performance with at least 10% sample rate, and may need 10% re-training time with 20% sample rate. If the user specifies a requirement of no more than 10% re-training time to achieve 98% of original performance, the sample rate can fall within the range between 10% and 20%.

Figures 10A, 10B:
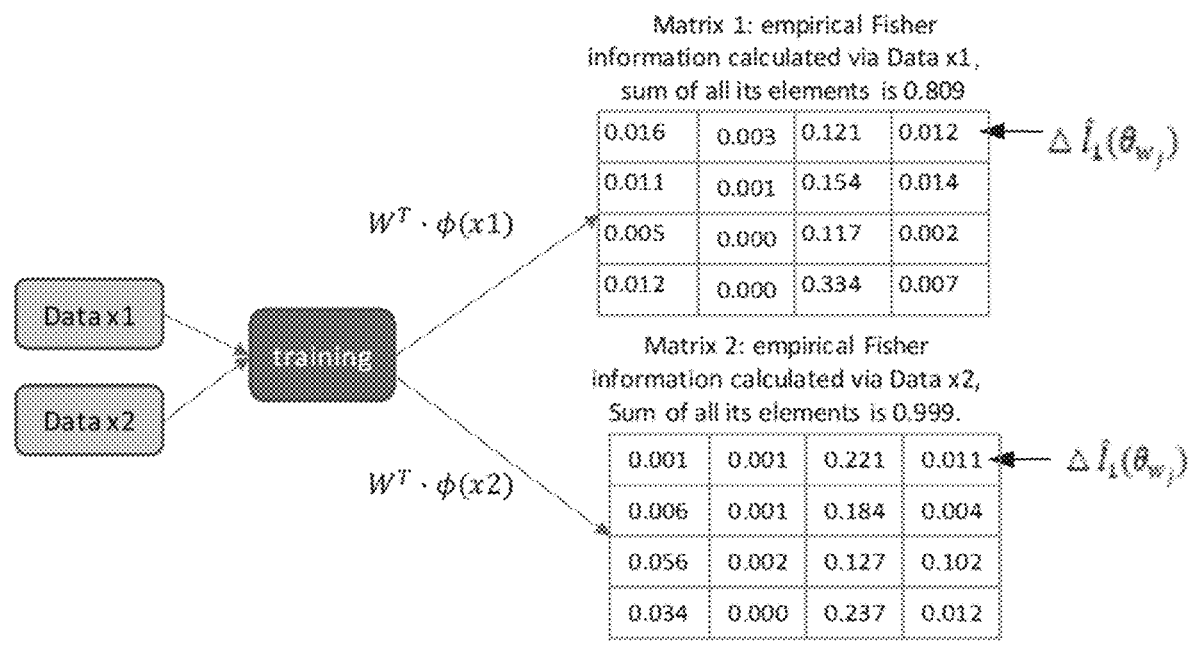
FIGS. 10A and 10B show further examples of empirical Fisher information matrix in accordance with this disclosure.
Figure 11:
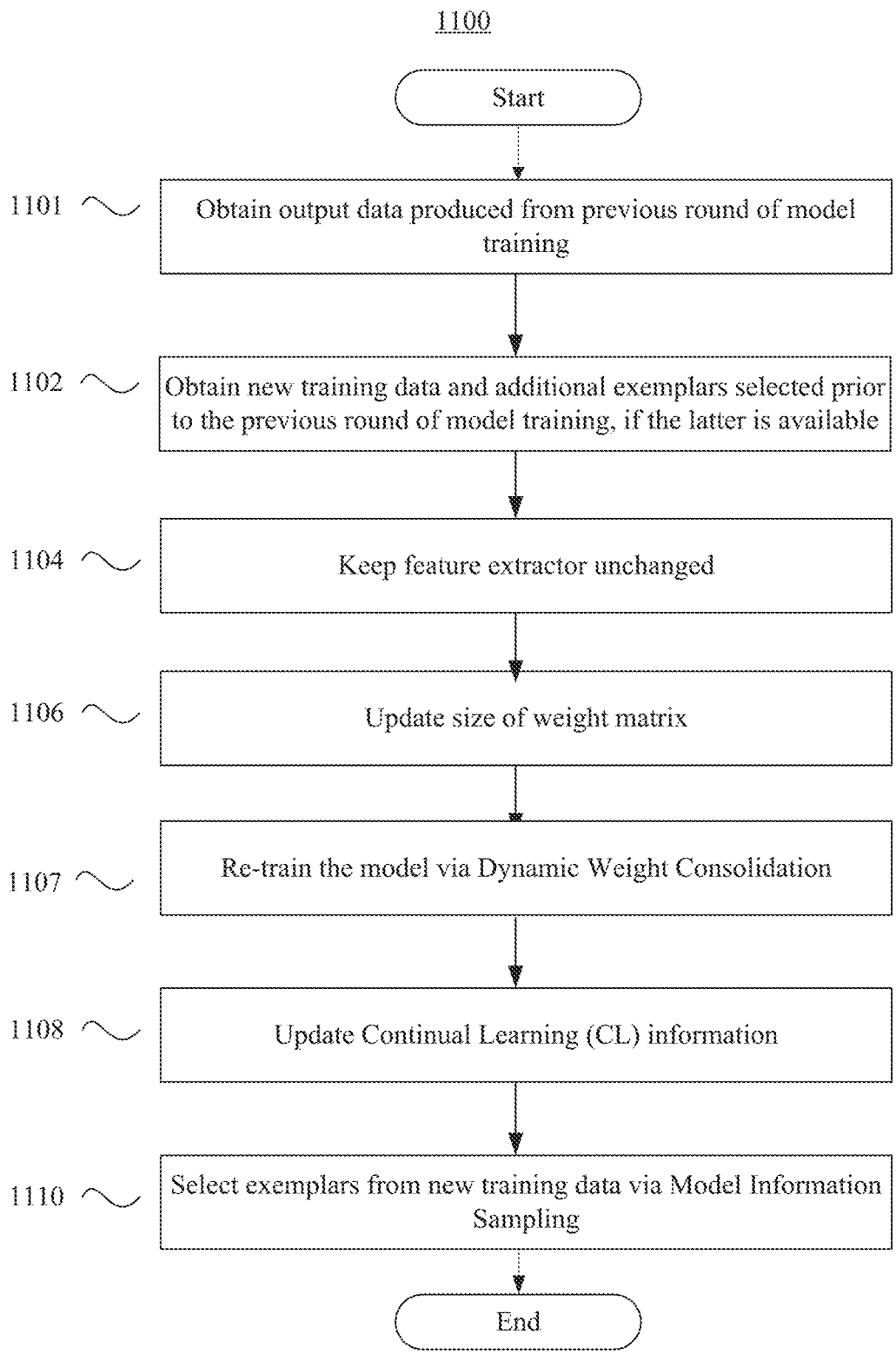
FIG. 11 illustrates an example method for parameter-free model continual learning in accordance with this disclosure.

FIG. 10A shows two empirical Fisher information matrices that are calculated as a result of two input data x1 and x2, both are from old data $X^o$. The empirical Fisher information matrices are calculated following Alg. 1. Data x2 is deemed more important than data x1 because the former has a higher sum value of empirical Fisher information matrix (0.999) than the latter (0.809). Therefore, if both data x1 and data x2 have the same class labels, data x2 may be selected to form the exemplars over data x1.

One embodiment presents Dynamic Weight Consolidation (DWC), an approach that preserves important parameters of a trained model during re-training. CL Information generated as a result of previous training is input to DWC. One embodiment shows that important parameters of weight matrix 406 of a classification model are maintained during re-training without hyper-parameter setting. In one embodiment, CL Information is formulated based on empirical Fisher Information matrices. Thus, DWC avoids "destroying" these important parameters of the weight matrix by referring to their corresponding empirical Fisher information. Experiments prove that DWC performs more stably than existing approaches.

One embodiment considers the loss function during the re-training process as sum of two part: classification loss $\ell_c$ calculated by the correct class predictions of new data as:

$$\ell_c = -\sum_{y\in Y^n} y\log\hat{y}, \quad (7a)$$

and distillation loss $\ell_d$ to maintain the performance of the previously trained model (prior to re-training). The distillation loss may be further divided into two parts, according to one embodiment, as:

$$\ell_d = -\sum_{y\in E} y\log\hat{y} + \frac{\lambda}{2}\sum_{w=1}^{h\times k}\hat{I}(\theta_w^n)(\hat{\theta}_w^n - \theta_w^o)^2, \quad (7b)$$

where k is the number of domains that the model has been trained to classify so far (which includes k classes associated with $X^o$ and k' classes associated with $X^n$), and h is the size of final hidden state. The first part is the cross entropy of exemplars of the old training data, and the second part is the consolidation loss, which is caused by modifying parameters of the weight matrix. $\hat{I}(\theta_w^n)$ represents the CL Information, which is based on a total of empirical Fisher information matrices of all parameters of the weight matrix, and with it, the consolidation loss reveals the impact of modifying important parameters of weight matrix that correspond to high empirical Fisher information to the overall loss.

In Eq. 7(b), $\lambda$ balances cross entropy and consolidation loss. To avoid large changes to the important parameters, regularization-based CL methods usually add constraints to the loss function. $\lambda$, which is a hyper-parameter, is one of such constraints that require careful initialization. It denotes how important the old task is compared to the new one. While tuning it may control the impact of the consolidation loss for the overall loss, conventionally, extensive human efforts are required to choose a fixed value for it. When it is set by a big value, the consolidation loss is hard to converge and suffers from fluctuations. When it is initialized with a relatively small value, the consolidation loss may be too small to be effective. Sometimes, an increase of the consolidation loss may be observed before it slowly decreases. Thus, determining and tuning λ means human involvements are required every single time the model is re-trained to accommodate a new class of data. To achieve automation, λ should be updated dynamically. One embodiment defines λ as a function of current values of cross entropy (of both new data and exemplars) and consolidation loss, which is shown in Eq. 8:

$$\lambda = \left| lg \frac{-\sum_{y \in \{Y^n, E\}} y \log \hat{y}}{\sum_{w=1}^{h \times k} \hat{I}(\theta_w^o)(\hat{\theta}_w^n - \theta_w^o)^2} \right|. \quad (8)$$

Following Eq. 8, λ is automatically and dynamically optimized during the re-training process to minimize the value of the distillation loss. DWC achieves parameter-free continual learning by being capable of adopting to any new dataset automatically without human efforts in tuning λ.

Changes of the consolidation loss may be more significant than cross entropy. λ may be defined using other formulas to automatically correlate the cross entropy and consolidation loss to provide a balance so that their impacts to the overall loss are comparable.

In one embodiment, following Eq. 2, Dynamic Weight Consolidation identifies important parameters of the model based on values of mean matrix of all the empirical Fisher information matrices. As parameters associated with larger empirical Fisher information are considered to be more important, the re-training process will try to modify the ones that correspond to smaller mean values. For example, as shown in FIG. 10B, if the training data includes only data x1 and data x2, the mean value of empirical Fisher information of $\theta_{w_j}$ is (0.012+0.011)/2=0.0115. FIG. 10B illustrates a mean matrix of empirical Fisher information matrix 1 and empirical Fisher information matrix 2 of FIG. 10A, where the 2nd column of the mean matrix has the smallest mean values indicating that the corresponding parameters of the weight matrix are less important. Following such calculation, during re-training, the model will try to first modify parameters of the weight matrix that correspond to the $2^{nd}$ column of the mean matrix shown in FIG. 10B.

In one embodiment, the mean matrix of all the empirical Fisher information matrices shown in FIG. 10B is provided as the CL Information to be used in the next round of re-training, where the 2nd column indicates a second group of variables, and the rest of the columns represent a first group of variables. Modifications to parameters of the weight matrix corresponding to the first group of variables have stronger impact to performance of the model than modifications to parameters of the weight matrix corresponding to the second group of variables.

FIG. 11 illustrates an example method 1100 for parameter-free CL, according to some embodiments. For ease of explanation, method 1100 of FIG. 11 may be performed by electronic device 100 of FIG. 1. However, the method 1100 may be used with any suitable device(s) and in any suitable system(s), such as when the method 1100 is performed by server 106 in FIG. 2 or in another system.

At step 1101, output data produced from a previous round of model training is obtained by electronic device 100. This may include, for example, processor 120 of the electronic device 100 obtaining the output data, such as from electronic device(s) 102/104 and/or server 106 or memory 130 of the electronic device 100. The previous round of training results in a first model $\Theta^o$, such as $M_0$ 302, for a first task using a first training data $X^o$ including $k_o$ classes. In one embodiment, the first task is a classification task.

The output data includes: 1) the first model $\Theta^o$ that has been optimized for the first task; 2) exemplars E selected from the first training data $X^o$, and 3) CL Information $F^o$, such as CL Information $F_0$ 308, of the first task, according to some embodiments. In one embodiment, the first model $\Theta^o$ includes a feature extractor matrix Φ, such as feature extractor matrix 404, and a weight matrix $W^{k_o}$, such as weight matrix 406, with dimension $h \times k_o$, which is optimized. In one embodiment, the CL Information is $F^o = \hat{I}(\theta^o)$, the mean matrix of empirical Fisher information matrices associated with the first model $\Theta^o$, where each element of $F^o$ may be computed following Eq. 5 as a result of the previous round of training process. Each element in $F^o$ corresponds to empirical Fisher information $\hat{I}(\theta_{w_j}^o)$, such as the mean value of $\hat{I}(\theta_{w_j}^o)$ according to one embodiment. Exemplars E may be selected from the first training data $X^o$ following Alg. 1.

At step 1102, a second training data data $X^n$ of $k_n$ classes that are associated with a second task is obtained by electronic device 100 for second round of model training, the model re-training. This may include, for example, processor 120 of the electronic device 100 obtaining the second training data from electronic device(s) 102/104 and/or server 106 or memory 130 of the electronic device 100.

In one embodiment, the previous round of training may be the initial round of training, which is the very first time to create the first model $\Theta^o$. In another embodiment, the previous round of training may itself be a round of re-training, during which the first model $\Theta^o$ was re-trained to be a renewed/re-trained model, such as $M_1$ 312. In the latter case, additional exemplars E* selected prior to the previous round of training may be obtained at step 1102 as well. For example, in FIG. 3, at the time of the $2^{nd}$ re-training, exemplars 306 of k classes are the additional exemplars E*. Also, in the latter case, the first model $\Theta^o$ has been trained further based on the additional exemplars E*.

At step 1104, the feature extractor matrix Φ, such as feature extractor matrix 404, is kept unchanged. This may include, for example, processor 120 of the electronic device 100 freezing feature extractor 403. For embodiments using BERT models, this means to freeze the BERT encoder with Transformer blocks and self-attention heads.

At step 1106, size of weight matrix $W^{k_o}$, such as weight matrix 406, is updated. This may include, for example, processor 120 of the electronic device 100 expanding weight matrix 406. Assuming there is no additional exemplars E*, to adopt the new classes data $X^n$, weight matrix $W^{k_o}$ is expanded to $W^{k_o+k_n} \in R^{h \times (k_o+k_n)}$, where the first columns are the same as the first model $\Theta^o$ and the new columns are initialized with random numbers.

At step 1107, the first model $\Theta^o$ is re-trained to produce the renewed model, the second model $\Theta^n$, such as $M_1$ 312. This may include, for example, processor 120 of the electronic device 100 updating weight matrix $W^{k_o}$ to $W^{k_o+k_n}$ through DWC based on both the new training data $X^n$ and exemplars E utilizing the CL Information $F^o$.

Similar to weight matrix $W^{k_o}$, CL Information $F^o$ is a matrix with dimension $h \times k_o$. To adopt the second training data $X^n$, it is expanded to $h \times (k_0+k_n)$ matrix $F^n = \hat{I}(\theta^n)$, where the first $k_o$ columns have the same value as the corresponding ones in $F^o$ and the new $k_n$ columns are initialized with zero. With empirical Fisher information involved in loss calculation as indicated by Eqs. 7b and 8, according to one embodiment, the weight matrix $W^{k_o}$ can freely update parameters corresponding to the new $k_n$ columns of $F^n$ to lower the loss, but will receive penalty when modifying important parameters corresponding to variables with higher value in the original $k_o$ columns of $F^n$.

At step 1108, the value of the variables of CL Information $F^n$ is updated. This may include, for example, processor 120 of the electronic device 100 calculating the mean matrix of the updated empirical Fisher information matrices in response to the updated weight matrix $W^{k_o+k_n}$.

At step 1110, further exemplars $E^n$ are selected from the second training data via Model Information Sampling. This may include, for example, processor 120 of the electronic device 100 sampling the second training data $X^n$ to select exemplars following Alg. 1.

Although FIG. 11 illustrates one example of a method 1100 for parameter-free CL, various changes may be made to FIG. 11. For example, while shown as a series of steps, various steps in FIG. 11 may overlap, occur in parallel, occur in a different order, or occur any number of times.

Figure 12:
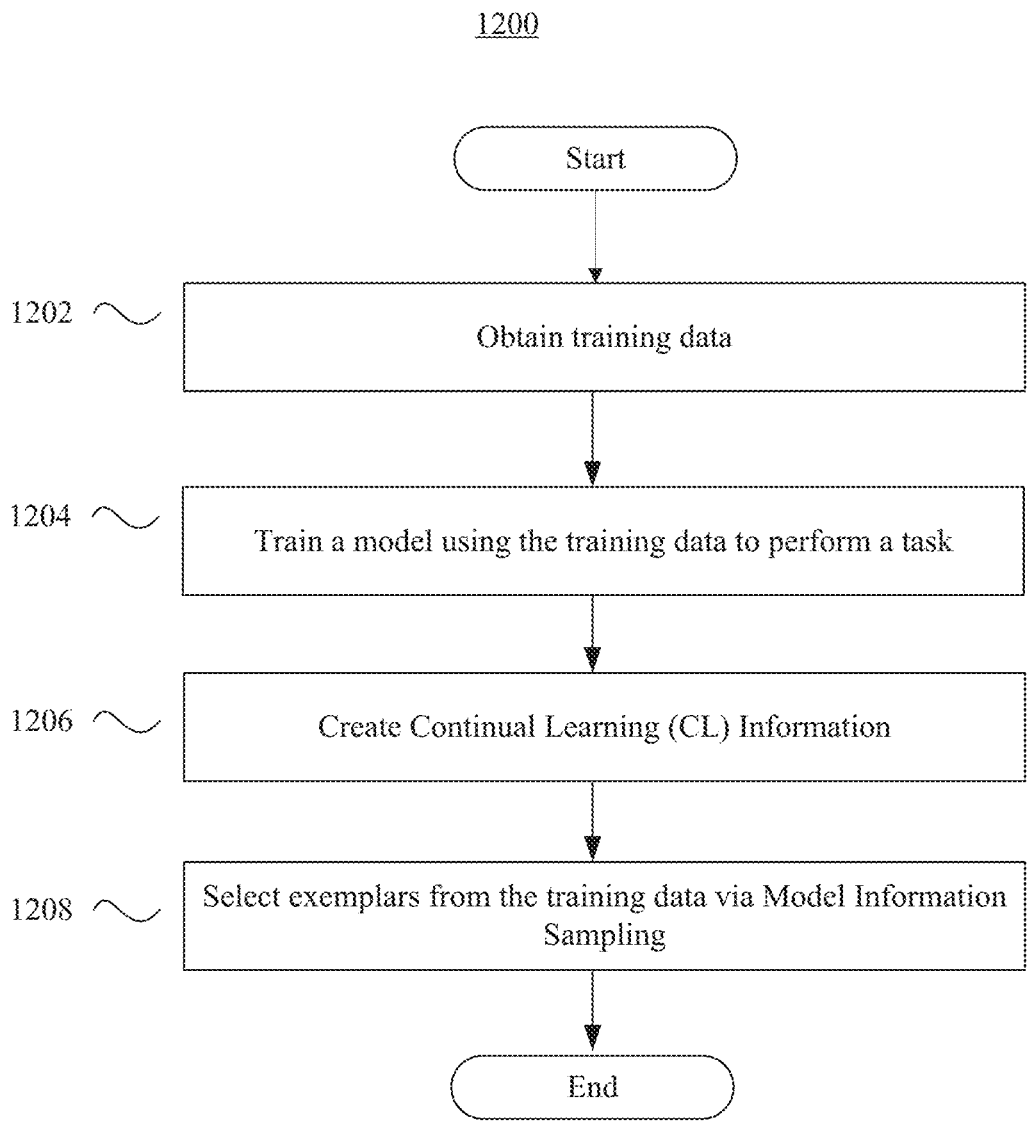
FIG. 12 illustrates another example method for parameter-free model continual learning in accordance with this disclosure.

When the previous round of model training is the initial round of training, the very first time to create the trained model, there is no output data produced from previous round of model training, and the model is trained based on the cross entropy of the first training data. In one embodiment, the CL Information is based on empirical Fisher information matrices and is calculated following Eq. 5. FIG. 12 illustrates an example method 1200 for the initial round of training to achieve parameter-free CL, according to some embodiments. For ease of explanation, method 1200 of FIG. 12 may be performed by electronic device 100 of FIG. 1. However, method 1200 may be used with any suitable device(s) and in any suitable system(s), such as when the method 1200 is performed by server 106 in FIG. 2 or in another system.

At step 1202, training data $X^o$ associated with initial classes $k^o$ are obtained by electronic device 100. This may include, for example, processor 120 of the electronic device 100 obtaining the training data, such as from electronic device(s) 102/104 and/or server 106 or memory 130 of the electronic device 100.

At step 1204, model $\Theta^o$, such as $M_0$ 302, is trained using training data $X^o$, such as old training data 304 with k classes, to perform a task. In one embodiment, model $\Theta^o$ is a DNN model and the task is for classification. In one embodiment, model $\Theta^o$ comprises feature extractor matrix $\Phi$, such as feature extractor matrix 404 implemented in BERT, and classifier matrix $W^{k_o}$, such as weight matrix 406 implemented in softmax classifier. This may include, for example, processor 120 of the electronic device 100 producing weight matrix 406.

At step 1206, CL Information $F^o$, such as CL Information $F_0$ 308, is created. This may include, for example, processor 120 of the electronic device 100 calculating empirical Fisher information matrices. In one embodiment, the CL Information $F^o$ is the mean matrix shown in FIG. 10B, which is created based on empirical Fisher information matrices with each empirical Fisher information matrix computed following Eq. 5 and corresponding to respective data from the training data $X^o$.

At step 1208, exemplars E, such as exemplars 306, are selected from training data $X^o$ via Model Information Sampling 303. This may include, for example, processor 120 of the electronic device 100 sampling training data $X^o$ to select exemplars following Alg. 1.

Although FIG. 12 illustrates one example of a method 1200 for parameter-free CL, various changes may be made to FIG. 12. For example, while shown as a series of steps, various steps in FIG. 12 may overlap, occur in parallel, occur in a different order, or occur any number of times.

Extensive experiments demonstrate that embodiments significantly and consistently outperform conventional method by up to 20% in average accuracy. The high performance in the overall accuracy, new task accuracy and old task accuracy, can be achieved with very small amount of old training data (e.g., 1%). The performance gap between this disclosure and conventional methods is enlarged when more new classes are added in the re-training process. Applying the parameter-free CL technique, an on-device AI assistant is able to recognize utterances and/or images from pre-given domains as well as utterance and/or images from new emerging domains. For example, a voice assistant that includes a model trained to recognize domains of "game," "sports," and "finance" is deployed on device. Implementing methods described in this disclosure, the voice assistant will be able to learn a user-specific domain of "covid-19" very efficiently and stably on device, rather than going through a time consuming re-training process in the cloud. For another example, an AI model trained with only "dog" and "cat" categories will be able to learn to recognize images of user's personalized interests, such as "lion" and "tiger," correctly on device utilizing the above described model re-training technique.

Although this disclosure has been described with example embodiments, various changes and modifications may be suggested to one skilled in the art. It is intended that this disclosure encompass such changes and modifications as fall within the scope of the appended claims.

What is claimed is:

1. A continual learning method, comprising:
    obtaining, by an electronic device, an input data including a trained model trained for one or more tasks, continual learning (CL) Information of the trained model, and training data of the one or more tasks;
    re-training, by the electronic device, the trained model for a new task based on the CL information of the trained model and new training data of the new task, resulting in a re-trained model that is trained for the one or more tasks and the new task;
    updating, by the electronic device, the CL Information based on the re-trained model and the new training data, resulting in updated CL Information, wherein the updating of the CL Information comprises:
        determining a first group of variables associated with a first group of model parameters of the re-trained model and a second group of variables associated with a second group of model parameters of the re-trained model; and
        adding, to the CL Information, the determined first group of variables and the determined second group of variables,
        wherein changes to the first group of variables cause a larger variation on the first group of model parameters of the re-trained model than variations on the second group of model parameters of the re-trained model caused by changes to the second group of variables; and selecting, by the electronic device, a first set of exemplars from the new training data based on data associated with the updated CL Information.

2. The continual learning method of claim 1, wherein the new training data comprises:
a first group of data associated with a first group of one or more classes, and
a second set of exemplars selected from a second group of data associated with a second group of one or more classes.

3. The continual learning method of claim 2, wherein:
selecting the first set of exemplars further comprises selecting exemplars from the first group of data based on the data associated with the updated CL Information, and
the first set of exemplars carry more information about the re-trained model than rest of the first group of data.

4. The continual learning method of claim 2, wherein:
the new task includes a first task and a second task, and
the re-training of the trained model for the new task further includes re-training the trained model to expand performance of the trained model from the second task to the first task, wherein:
the first task is trained based on both the first group of data and the second set of exemplars, and
the second task is trained based on the second group of data.

5. The continual learning method of claim 1, wherein the updating of the CL Information further comprises updating the CL Information as a result of introducing more changes to the second group of model parameters associated with the second group of variables of the updated CL Information than to the first group of model parameters associated with the first group of variables of the updated CL Information.

6. The continual learning method of claim 1, wherein the updated CL Information is calculated utilizing Fisher information.

7. The continual learning method of claim 1, wherein the re-training of the trained model further comprises minimizing error associated with a loss function that corresponds to the CL Information.

8. The continual learning method of claim 1, wherein each variable of the updated CL Information corresponds to a respective model parameter and reflects $2^{nd}$ order derivative of the respective model parameter.

9. An apparatus, comprising:
at least one processor configured to:
obtain an input data including a trained model trained for one or more tasks, continual learning (CL) Information of the trained model, and training data of the one or more tasks;
re-train the trained model for a new task based on the CL information of the trained model and new training data, resulting in a re-trained model that is trained for the one or more tasks and the new task;
update the CL Information based on the re-trained model and the new training data, resulting in updated CL Information, wherein to update the CL Information comprises to:
determine a first group of variables associated with a first group of model parameters of the re-trained model and a second group of variables associated with a second group of model parameters of the re-trained model; and
add, to the CL Information, the determined first group of variables and the determined second group of variables,
wherein changes to the first group of variables cause a larger variation on the first group of model parameters of the re-trained model than variations on the second group of model parameters of the re-trained model caused by changes to the second group of variables; and
select a first set of exemplars from the new training data based on data associated with the updated CL Information; and
a memory coupled to the at least one processor, wherein the memory stores the re-trained model.

10. The apparatus of claim 9, wherein the new training data comprises:
a first group of data associated with a first group of one or more classes, and
a second set of exemplars selected from a second group of data associated with a second group of one or more classes.

11. The apparatus of claim 10, to select the first set of exemplars, the at least one processor is further configured to select exemplars from the first group of data based on the data associated with the updated CL Information, and the first set of exemplars carry more information about the re-trained model than rest of the first group of data.

12. The apparatus of claim 10, wherein:
the new task includes a first task and a second task, and
to re-train the trained model for the new task, the at least one processor is further configured to re-train the trained model to expand performance of the trained model from the second task to the first task, wherein:
the first task is trained based on both the first group of data and the second set of exemplars, and
the second task is trained based on the second group of data.

13. The apparatus of claim 9, to update the CL Information, the at least one processor is further configured to update the CL Information as a result of introducing more changes to the second group of model parameters associated with the second group of variables of the updated CL Information than to the first group of model parameters associated with the first group of variables of the updated CL Information.

14. The apparatus of claim 9, wherein the updated CL Information is calculated utilizing Fisher information.

15. The apparatus of claim 10, to re-train the trained model, the at least one processor is further configured to minimize error associated with a loss function that corresponds to the CL Information.

16. A non-transitory computer readable medium containing instructions that when executed by at least one processor cause the at least one processor to:
obtain an input data including a trained model trained for one or more tasks, continual learning (CL) Information of the trained model, and training data of the one or more tasks;
re-train the trained model for a new task based on the CL information of the trained model and new training data of the new task, resulting in a re-trained model that is trained for the one or more tasks and the new task;
update the CL Information based on the re-trained model and the new training data, resulting in updated CL Information, wherein to update the CL Information comprises to:
determine a first group of variables associated with a first group of model parameters of the re-trained model and a second group of variables associated with a second group of model parameters of the re-trained model; and add, to the CL Information, the determined first group of variables and the determined second group of variables, wherein changes to the first group of variables cause a larger variation on the first group of model parameters of the re-trained model than variations on the second group of model parameters of the re-trained model caused by changes to the second group of variables; and select a first set of exemplars from the training data based on data associated with the CL Information.

17. The non-transitory computer readable medium of claim 16, wherein the new training data comprises:

a first group of data associated with a first group of one or more classes, and a second set of exemplars selected from a second group of data associated with a second group of one or more classes.

18. The non-transitory computer readable medium of claim 17, to select the first set of exemplars, containing further instructions that when executed by the at least one processor cause the at least one processor to select exemplars from the first group of data based on the data associated with the updated CL Information, and the first set of exemplars carry more information about the re-trained model than rest of the first group of data.

19. The non-transitory computer readable medium of claim 17, wherein:

the new task includes a first task and a second task, and to re-train the trained model for the new task, containing further instructions that when executed by the at least one processor cause the at least one processor to re-train the trained model to expand performance of the trained model from the second task to the first task, wherein:

the first task is trained based on both the first group of data and the second set of exemplars, and the second task is trained based on the second group of data.

20. The non-transitory computer readable medium of claim 16, to update the CL Information, containing further instructions that when executed by the at least one processor cause the at least one processor to update the CL Information as a result of introducing more changes to the second group of model parameters associated with the second group of variables of the updated CL Information than to the first group of model parameters associated with the first group of variables of the updated CL Information.

21. A continual learning method, comprising:

obtaining, by an electronic device, training data of a new task;

training, by the electronic device, a trained model using the training data to perform the new task, the trained model having been trained to perform one or more tasks, the training of the trained model resulting in a re-trained model that is trained to perform the one or more tasks and the new task;

creating, by the electronic device, continual learning (CL) Information of the re-trained model, wherein the creating of the CL Information comprises:

determining a first group of variables associated with a first group of model parameters of the re-trained model and a second group of variables associated with a second group of model parameters of the re-trained model; and adding, to the CL Information, the determined first group of variables and the determined second group of variables, wherein changes to the first group of variables cause a larger variation on the first group of model parameters of the re-trained model than variations on the second group of model parameters of the re-trained model caused by changes to the second group of variables; and selecting, by the electronic device, a set of exemplars from the training data based on data associated with the CL Information.

22. The continual learning method of claim 21, wherein the training is based on cross entropy loss associated with only the training data, and the CL information is based on empirical Fisher information matrices.

* * * * *